United States Patent
Liu et al.

(10) Patent No.: US 10,373,003 B2
(45) Date of Patent: Aug. 6, 2019

(54) DEEP MODULE AND FITTING MODULE SYSTEM AND METHOD FOR MOTION-BASED LANE DETECTION WITH MULTIPLE SENSORS

(71) Applicant: TUSIMPLE, San Diego, CA (US)

(72) Inventors: Siyuan Liu, San Diego, CA (US); Mingdong Wang, San Diego, CA (US); Xiaodi Hou, San Diego, CA (US)

(73) Assignee: TUSIMPLE, San Diego, CA (US)

( * ) Notice: Subject to any disclaimer, the term of this patent is extended or adjusted under 35 U.S.C. 154(b) by 12 days.

(21) Appl. No.: 15/683,463

(22) Filed: Aug. 22, 2017

(65) Prior Publication Data

US 2019/0065866 A1 Feb. 28, 2019

(51) Int. Cl.
| | |
|---|---|
| *G06K 9/00* | (2006.01) |
| *G01S 19/01* | (2010.01) |
| *B60W 40/072* | (2012.01) |
| *G06T 7/246* | (2017.01) |

(52) U.S. Cl.
CPC ....... *G06K 9/00798* (2013.01); *B60W 40/072* (2013.01); *G01S 19/01* (2013.01); *G06T 7/246* (2017.01); *B60W 2550/402* (2013.01); *G06T 2207/30256* (2013.01)

(58) Field of Classification Search
CPC ............ G06K 9/00798; B60W 40/072; B60W 2550/402; G01S 19/01; G06T 7/246; G06T 2207/30256
See application file for complete search history.

(56) References Cited

U.S. PATENT DOCUMENTS

| | | | | |
|---|---|---|---|---|
| 9,063,548 | B1* | 6/2015 | Ferguson | G05D 1/0231 |
| 2013/0182957 | A1* | 7/2013 | Wujcicki | G01C 21/32 |
| | | | | 382/191 |
| 2015/0112765 | A1* | 4/2015 | Sundaresh | G06Q 10/1053 |
| | | | | 705/7.31 |
| 2018/0120859 | A1* | 5/2018 | Eagelberg | G05D 1/0088 |
| 2018/0217600 | A1* | 8/2018 | Shashua | G01C 21/32 |

FOREIGN PATENT DOCUMENTS

CN 102184535 * 9/2011

OTHER PUBLICATIONS

Machine translation for CN 102184535 (Year: 2011).*
Aharon Bar Hillel et al., Recent Progress in Road and Lane Detection—A survey.

* cited by examiner

*Primary Examiner* — Qian Yang
(74) *Attorney, Agent, or Firm* — WPAT, PC

(57) ABSTRACT

A method of lane detection for a non-transitory computer readable storage medium storing one or more programs is disclosed. The one or more programs include instructions, which when executed by a computing device, cause the computing device to perform the following steps comprising: generating a ground truth; off-line training a lane detection algorithm by using the ground truth, the lane detection algorithm using parameters that express a lane marking in an arc; on-line generating a predicted lane marking; comparing the predicted lane marking against the ground truth; and off-line refining the lane detection algorithm.

20 Claims, 12 Drawing Sheets

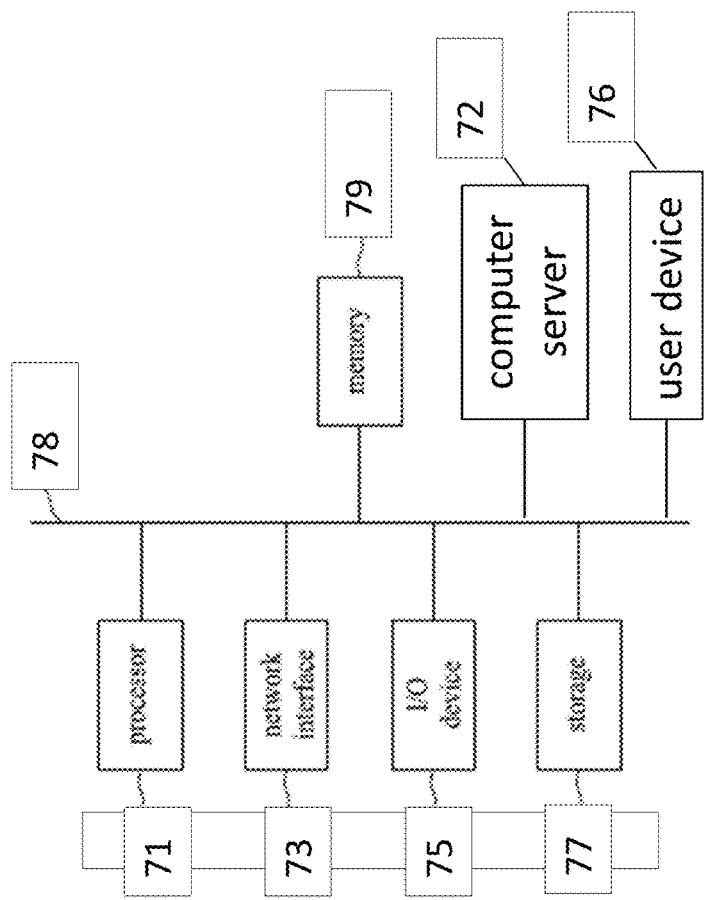

DEEP MODULE AND FITTING MODULE SYSTEM AND METHOD FOR MOTION-BASED LANE DETECTION WITH MULTIPLE SENSORS

PRIORITY/RELATED DOCUMENTS

This patent application incorporates by reference in their entireties and claims priority to these co-pending patent applications filed on Aug. 22, 2017, including the following: (1) Verification Module System and Method for Motion-Based Lane Detection with Multiple Sensors;" and (2) "Post-processing Module System and Method for Motion-Based Lane Detection with Multiple Sensors," and all with the same inventor(s).

FIELD OF THE DISCLOSURE

The field of the disclosure is in general related to autonomous vehicles and, in particular, to a method and system for lane detection.

BACKGROUND OF THE DISCLOSURE

An increasing safety and reducing road accidents, thereby saving lives are one of great interest in the context of Advanced Driver Assistance Systems. Intelligent and autonomous vehicles are promising solutions to enhance road safety, traffic issues and passengers' comfort. Among the complex and challenging tasks of road vehicles is road lane detection or road boundaries detection. Such detection is based on lane detection, which includes the localization of the road, the determination of the relative position between vehicle and road, and the analysis of the vehicle's heading direction. Lane marking, a main component on a highway, instructs an autonomous vehicle to interactively and safely drive on the highway. Even though a differential global positioning system (GPS) has become affordable, the precision of localization may not be desirably stable. Moreover, the control requires a precise location according to lanes in a current view.

BRIEF SUMMARY OF THE DISCLOSURE

Various objects, features, aspects and advantages of the present embodiment will become more apparent from the following detailed description of embodiments of the embodiment, along with the accompanying drawings in which like numerals represent like components.

Embodiments of the present disclosure provide a method of lane detection for a non-transitory computer readable storage medium storing one or more programs. The one or more programs include instructions, which when executed by a computing device, cause the computing device to perform the following steps comprising: generating a ground truth; off-line training a lane detection algorithm by using the ground truth, the lane detection algorithm using parameters that express a lane marking in an arc; on-line generating a predicted lane marking; comparing the predicted lane marking against the ground truth; and off-line refining the lane detection algorithm.

In an embodiment, generating a ground truth includes: collecting data in an environment by using sensors that include an inertial measurement unit (IMU) module, a global positioning system (GPS) module and a mapping (MAP) module; and generating a labeled lane marking by annotating a lane marking expressed in god's view.

In another embodiment, the IMU module provides information on at least one of a vehicle pose or a vehicle speed, and the GPS module provides information on at least one of a lane width, the number of lanes and a lane curvature.

In yet another embodiment, the MAP module is configured to create a map of its surroundings, and orient a vehicle itself within this map.

In still another embodiment, on-line generating a predicted lane marking includes: generating a hit-map image for a current view based on the lane detection algorithm; and generating a fitted lane marking based on the hit-map image and a lane template that includes features of a view immediately previous to the current view.

In yet still another embodiment, generating a fitted lane marking includes: optimizing, based on priors or constraints, the lane template to obtain a local optimal.

In still yet another embodiment, the method further comprises: determining that a confidence level of the fitted lane marking is reasonable, using the parameters; and outputting the fitted lane marking as a predicted lane marking.

In a further embodiment, the method further comprises: determining that a confidence level of the fitted lane marking is unreasonable, using the parameters; and rejecting the fitted lane marking.

In another further embodiment, off-line refining the lane detection algorithm includes: adding additional ground truth data in the off-line training.

In yet another further embodiment, the method further comprises: on-line generating another predicted lane marking, using a refined lane detection algorithm.

Embodiments of the present disclosure also provide a system for lane detection. The system includes an internet server that comprises: an I/O port, configured to transmit and receive electrical signals to and from a client device; a memory; one or more processing units; and one or more programs stored in the memory and configured for execution by the one or more processing units, the one or more programs including instructions for: generating a ground truth; off-line training a lane detection algorithm by using the ground truth, the lane detection algorithm using parameters that express a lane marking in an arc; on-line generating a predicted lane marking; comparing the predicted lane marking against the ground truth; and off-line refining the lane detection algorithm.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

FIG. 8 is a block diagram of a system for lane detection, in accordance with some embodiments.

DETAILED DESCRIPTION OF THE EMBODIMENTS

Figure 1:
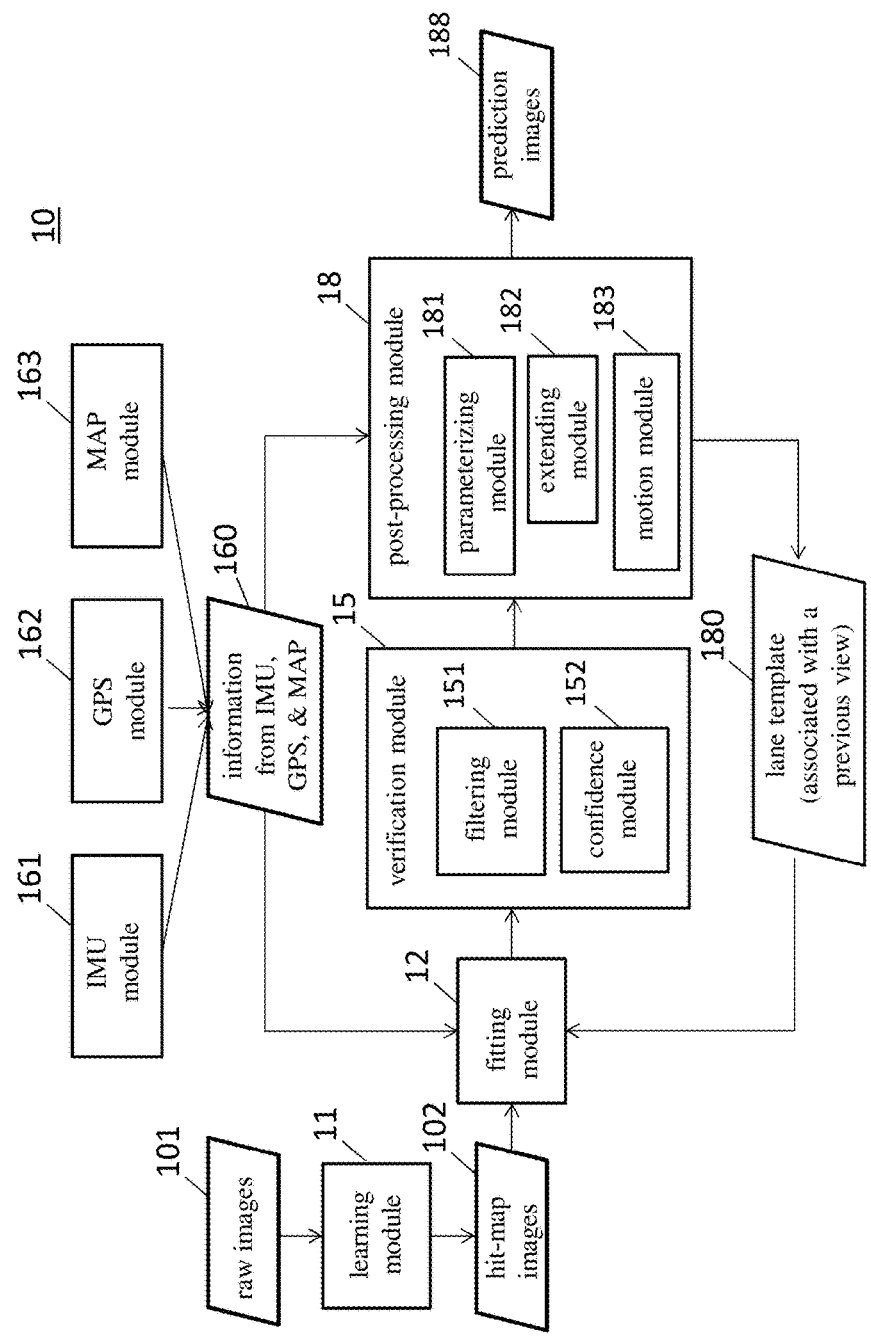
FIG. 1 is a block diagram of a system for on-line lane detection, in accordance with an embodiment.

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Any alterations and modifications in the described embodiments, and any further applications of principles described in this document are contemplated as would normally occur to one of ordinary skill in the art to which the disclosure relates. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment.

In the drawings, the figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

The appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result.

In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Reference is now made to the drawings wherein like numerals refer to like parts throughout.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

In some embodiments in accordance with the present disclosure, a non-transitory, i.e., non-volatile, computer readable storage medium is provided. The non-transitory computer readable storage medium is stored with one or more programs. When the program is executed by the processing unit of a computing device, i.e., that are part of a vehicle, the computing device is caused to conduct specific operations set forth below in accordance with some embodiments of the present disclosure.

In some embodiments, as illustrated in FIG. 8, examples of non-transitory storage computer readable storage medium may include magnetic hard discs, optical discs, floppy discs, flash memories, or forms of electrically programmable memories (EPROM) or electrically erasable and programmable (EEPROM) memories. In certain embodiments, the term "non-transitory" may indicate that the storage medium is not embodied in a carrier wave or a propagated signal. In some embodiments, a non-transitory storage medium may store data that can, over time, change (e.g., in RAM or cache).

In some embodiments in accordance with the present disclosure, in operation, a client application is transmitted to the computing device upon a request of a user, for example, by a smart phone 76 (see FIG. 8). For example, the first client device 76 may be a smart phone downloading the application from a computer server. In operation, the application is installed at the vehicle. Accordingly, specific functions may be executed by the user through a computing device, such as calibrating sensors and time synchronization, and, for example, sending and receiving calibration files for data alignment purposes.

FIG. 1 is a block diagram of a system 10 for on-line lane detection, in accordance with an embodiment. Referring to FIG. 1, the system 10 includes a learning module 11, a fitting module 12, a verification module 15 and a post-processing module 18.

Figure 2A:
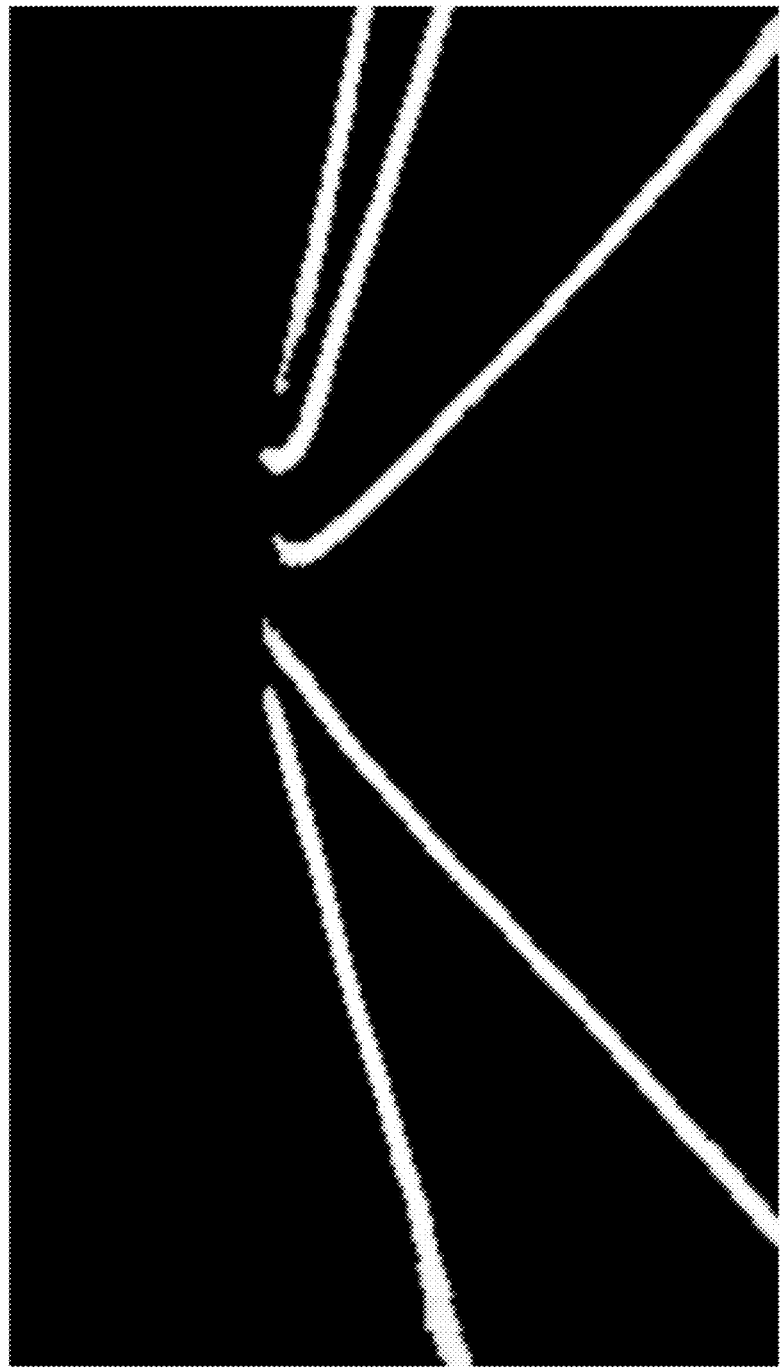
FIG. 2A is a diagram of an exemplary hit-map image generated by a learning module illustrated in FIG. 1.

The learning module 11 is configured to, based on a function or algorithm for lane detection, generate a hit-map image 102 in response to a raw image 101 of a current view. The raw image 101 is provided by sensors mounted on a vehicle, which may include at least one camera, a light detection and ranging (LiDAR) sensor, an inertial measurement unit (IMU) module 161, a global positioning system (GPS) module 162 and a mapping (MAP) module 163. In addition, the raw image 101 in an embodiment may include an RGB image captured by the at least one camera and a point cloud generated by the LiDAR. The lane detection algorithm can be expressed in a set of parameters that describe a relationship between the real time raw image 101 and the hit-map image 102. Also, the lane detection algorithm may be achieved through an off-line machine learning process 23 (FIG. 3) that will be discussed in detail with reference to FIG. 3. Moreover, the lane detection algorithm may be refined by a testing process 24 (FIG. 3) that will be discussed with reference to FIG. 3. The hit-map image 102 represents a classification of pixels that hit a lane marking. FIG. 2A is a diagram of an exemplary hit-map image 102 generated by the learning module 11.

The fitting module 12 is configured to generate a fitted lane marking for the current view in response to the hit-map image 102 from the learning module 11 and a lane template 180 from the processing module 18. In the present embodiment, with the help of the IMU module 161, GPS module 162 and MAP module 163, the lane marking is expressed in god's view, which means that when a car including the system 10 is taken as an origin, the orient of the car is the y-coordinate while the perpendicular direction of the car is the x-coordinate. In an embodiment, the fitting module 12, based on the hit-map image 102, optimizes points in the lane template 180 to obtain a local optimal. The lane template 180 represents an image of a view, having been processed by the processing module 18, immediately previous to the current view. The lane template 180 thus includes features of a previous view, and may include additional features, if any, from the post-processing module 18. Moreover, the lane template 180 is used to enhance the fitting speed and precision of the fitting module 12, which in turn facilitates the precision of a next lane template. During a fitting process, the fitting module 12 may use, but are not limited to, the following priors or constraints of a road:

(1) lane markings on a highway are parallel to each other;
(2) the shape of curvatures of lanes on a highway is a circle;

(3) the curvature of lanes on a highway is smaller than approximately three hundred (300) meters;

(4) the lane spacing between neighboring lanes on a highway ranges between approximately three and four (3~4) meters, for example, approximately 3.75 meters; and (5) the color at an edge of a lane marking is different from that at other portions of a highway absent from a lane marking.

These and other priors and constraints facilitate the optimization process in the fitting module 12. Moreover, providing a lane template associated with a previous view, as in the present embodiment of FIG. 1, further facilitates the optimization process in the fitting module 12.

The verification module 15 is configured to determine if a fitting result from the fitting module 12 is reasonable. The verification module 15 includes a filtering module 151 and a confidence module 152. The filtering module 151 is configured to remove incorrect or unreasonable fitted lines of lane markings based on the priors and constraints. The confidence module 152 is configured to determine a confidence level of each fitted lane markings. The confidence of a fitted lane marking facilitates a self-diagnosis in the processing module 18. Function or parameters employed in the confidence module 152 may be achieved through an off-line confidence training process 35 (FIG. 4A) that will be discussed in detail with reference to FIG. 4A.

The post-processing module 18 is configured to output an image of the current view, and generate a lane template for a next view. The post-processing module 18 includes a parameterizing module 181, an extending module 182 and a motion module 183 for lane markings, all of which facilitate optimization of the lane detection algorithm. The parameterizing module 181 is configured to fit a fitted lane marking into, for example, an arc of a circle, resulting in a predicted image 188. Therefore, the lane detection algorithm includes a set or parameters to express a lane marking in an arc. In addition, the verification module 15 determines, based on the parameters for lane markings, whether a fitted lane marking from the fitting module 12 is reasonable. The predicted image 188 is sent to a control system (not shown) for an upper motion planning.

The extending module 182 is configured to, based on priors and constraints, extend a fitted lane marking. In an embodiment, extending a fitted lane marking includes increasing the number of fitted lane markings in a lane template 180. For example, for a lane template that contains two fitted lane markings for the current view, by adding another two fitted lane markings, the next lane template contains four fitted lane markings for the next view. With the additional information on fitted lane marking, effectively, the fitting speed and precision of the fitting module 12 can be enhanced. Alternatively, the extending module 182 is configured to, based on a high-definition (HD) map, extend a fitted lane marking. The processing module 18 sends a lane template 180 associated with the current view to the fitting module 12 for use in the lane detection of a next view.

The motion module 183 takes advantage of information 160 from the IMU module 161, GPS module 162 and MAP module 163, and generates a lane template 180 based on a processed result from at least one of the parameterizing module 181 and the extending module 182. In an embodiment, the IMU module 161, GPS module 162 and MAP module 163 are configured to provide information on lanes under detection. The motion module 183 is configured to express a lane marking result from at least one of the parameterizing module 181 and the extending module 182 in god's view or a bird-eye's view and, using the information 160 from the IMU module 161, GPS module 162 and MAP module 163, obtain a more precise lane marking, which then serves as a lane template 180 associated with a previous view.

In an embodiment, the GPS module 162 provides geolocation information on at least one of a lane width, the number of lanes and a lane curvature. In addition, the IMU module 161 provides information on a vehicle pose. The pose of a vehicle is essential information for lane detection, in particular in some embodiments the lane detection algorithm according to the present disclosure is built under god's view, which means that a precise vehicle pose and a view-transformation matrix are advantageous. Also, the IMU module 161 provides information of the speed of the vehicle. As a result, the vehicle can move in a detected lane map and a better lane template can be obtained for use in lane detection of a next view. The MAP module 163, which may use the simultaneous localization and mapping (SLAM), facilitates the autonomous car to create a map of its surroundings, and orient the autonomous car itself properly within this map in real time. Effectively, with the information 160 from the IMU module 161, GPS module 162 and MAP module 163, and the lane template 180 from the motion module 183, the running time is reduced and the detection result is improved in the system 10.

Figure 2B:
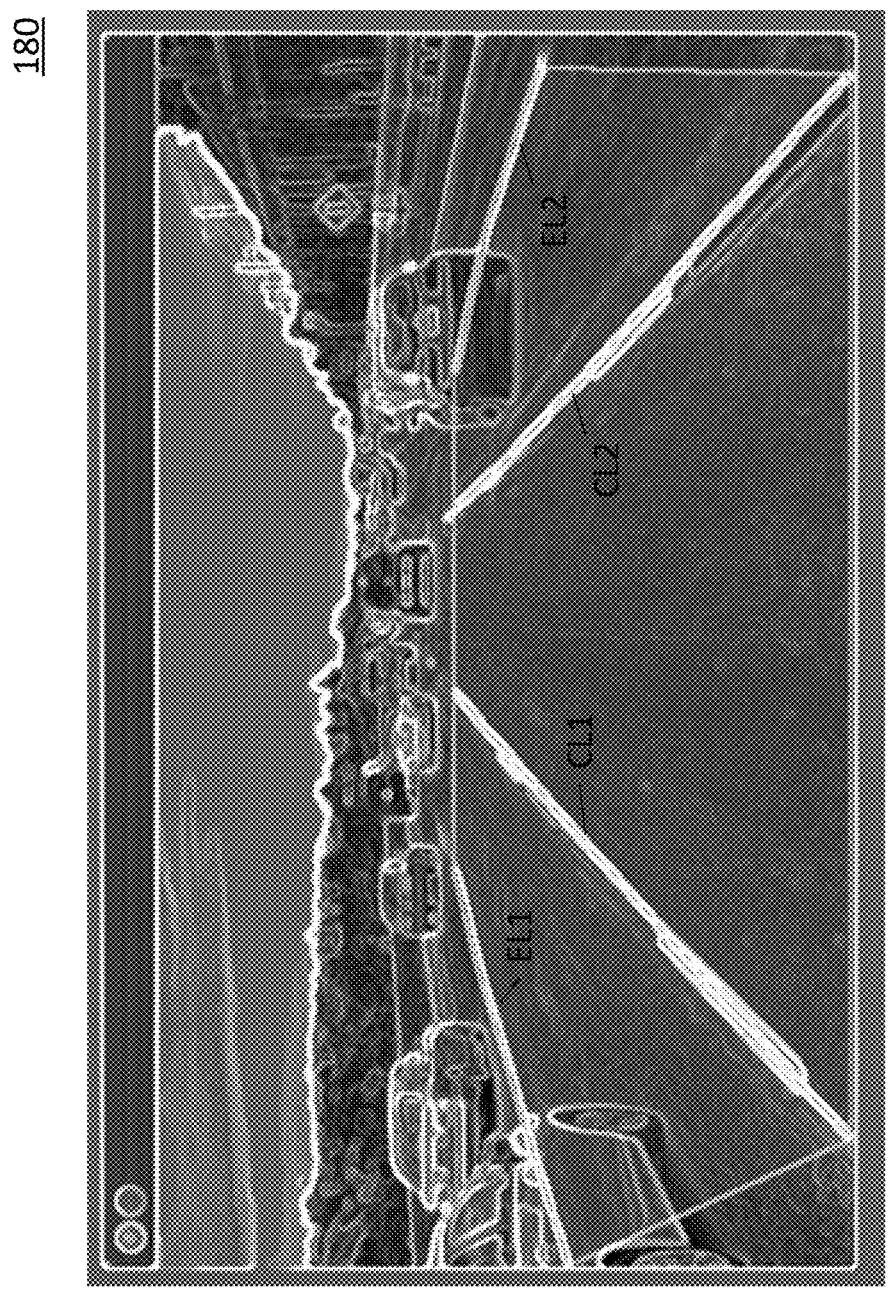
FIG. 2B is a diagram of an exemplary lane template generated, based on a previous view, by a motion module for lane markings illustrated in FIG. 1.
Figure 2C:
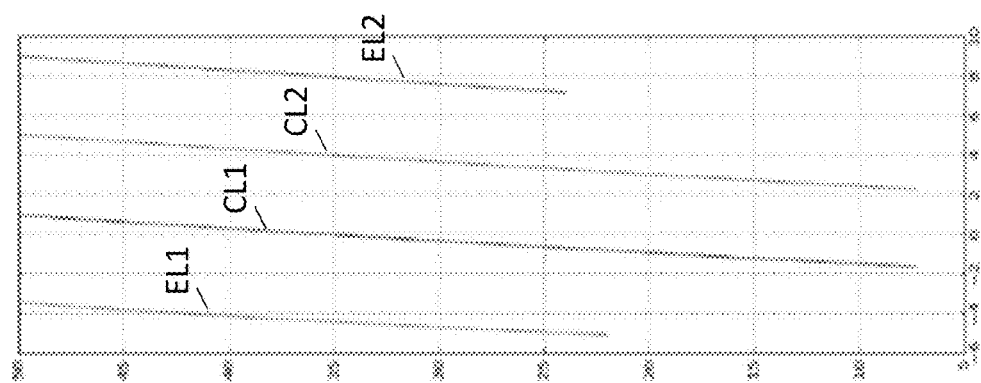
FIG. 2C is a schematic diagram of lane markings expressed in god's view, in accordance with an embodiment.

FIG. 2B is a diagram of an exemplary lane template 180 generated, based on a previous view, by the motion module 183 for lane markings. Referring to FIG. 2B, there are four lane markings CL1, CL2, EL1 and EL2 in the lane template 180. In the previous view, there may be only two central lane markings CL1 and CL2. The extending module 182 extends lane markings by increasing EL1 and EL2 for the previous view, resulting in the four lane markings CL1, CL2, EL1 and EL2. Subsequently, an image frame of the previous view with the four lane markings CL1, CL2, EL1 and EL2 is processed by the motion module 183 in god's view to improve the precision. FIG. 2C is a schematic diagram of lane markings CL1, CL2, EL1 and EL2 expressed in god's view, in accordance with an embodiment.

Figure 2D:
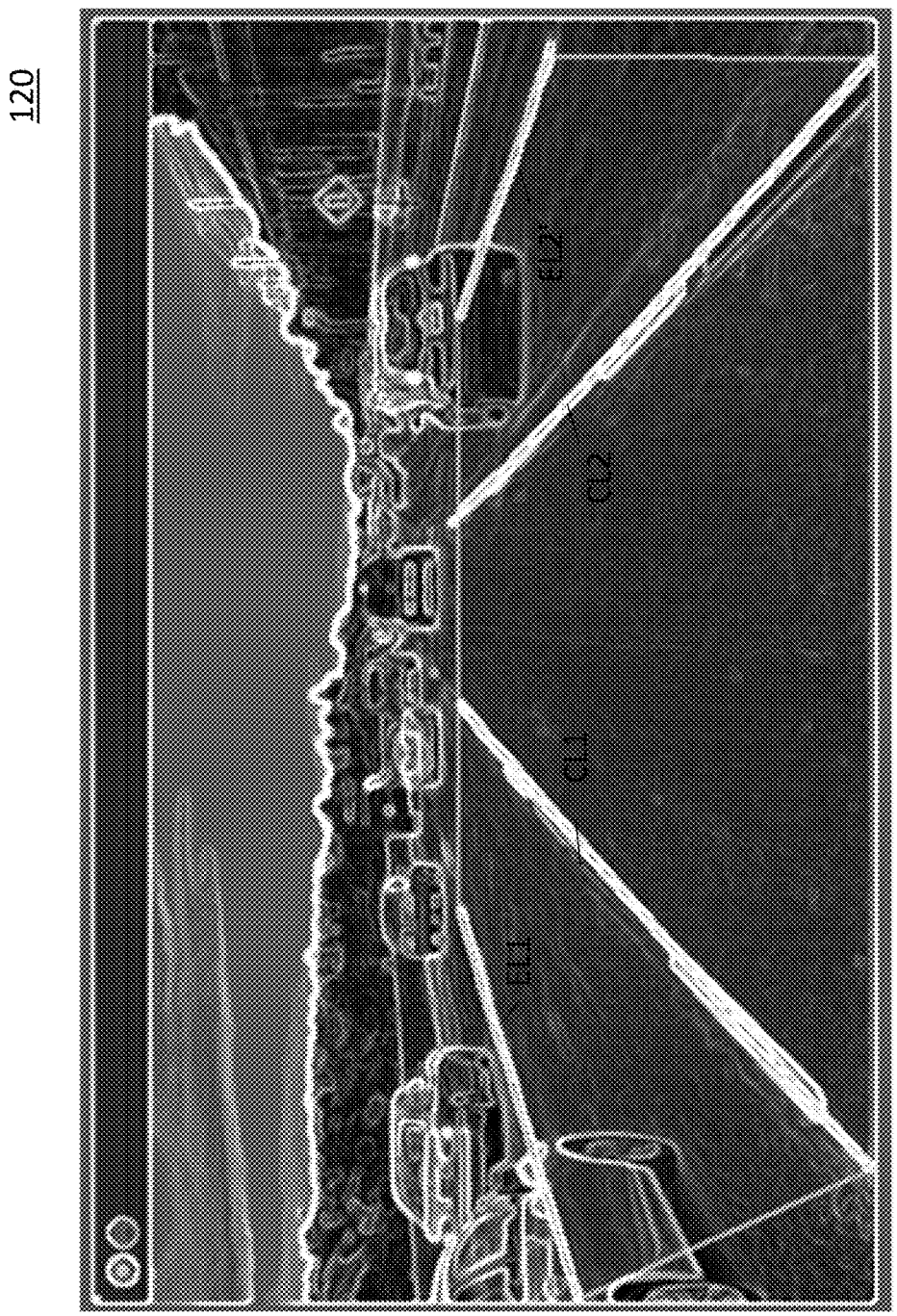
FIG. 2D is a diagram of an exemplary image of fitted lane markings generated for a current view by a fitting module illustrated in FIG. 1.

FIG. 2D is a diagram of an exemplary image 120 of fitted lane markings generated for a current view by the fitting module 12. Based on the hit-map image 102 as illustrated in FIG. 2A and the lane template 180 as illustrated in FIG. 2B, an image 120 of fitted lane markings CL1, CL2, EL1 and EL2' is generated. With the help of the lane template 180 from the post-processing module 18, a better result of fitting than that generated without any lane template can be expected. In addition, the image 120 is expected to be more precise than the lane template 180. For example, referring to FIG. 2D, the lane marking EL2' in the image 120 is more precise (which looks more like a straight line) than the lane marking EL2 in the lane template 180. The better fitted image 120, when passes a confidence check in the verification module 15, is then used as a basis for generating a new lane template for a next view by the motion module 183. The iteration process of generating a better lane template and a better fitted lane marking result facilitates a more robust and reliable lane detection algorithm. Moreover, as will be further discussed, if a fitted lane marking fails a confidence check or a predicted image 188 fails a testing check, the lane detection algorithm is refined, which also results in a more robust and reliable lane detection algorithm.

The lane detection system 10 makes it possible to utilize multiple sensors including IMU, GPS and MAP and take advantage of the information from these sensors. Some existing approaches, however, since no such algorithm for lane detection is built under god's view, may not achieve the desired effects of the present disclosure. Furthermore, in the system 10, a lot of priors coming from GPS, IMU and an HD map may be used. For example, with the real lane width at a present position available, a more precise lane template can be generated for the next view, which significantly accelerates optimization of the confidence module 152 and the lane detection algorithm. Other priors, such as the curvature of lanes and the number of lanes, also facilitate the optimization process. In some embodiment, the fitting module 12 may be configured to optimize, based on priors including the information from the GPS, the lane template associated with a previous view. Also, the filtering module 151 of the verification module 15 may be configured to rule out, based on priors including the information from the GPS, incorrect fitting lines of the fitted lane marking.

Figure 3:
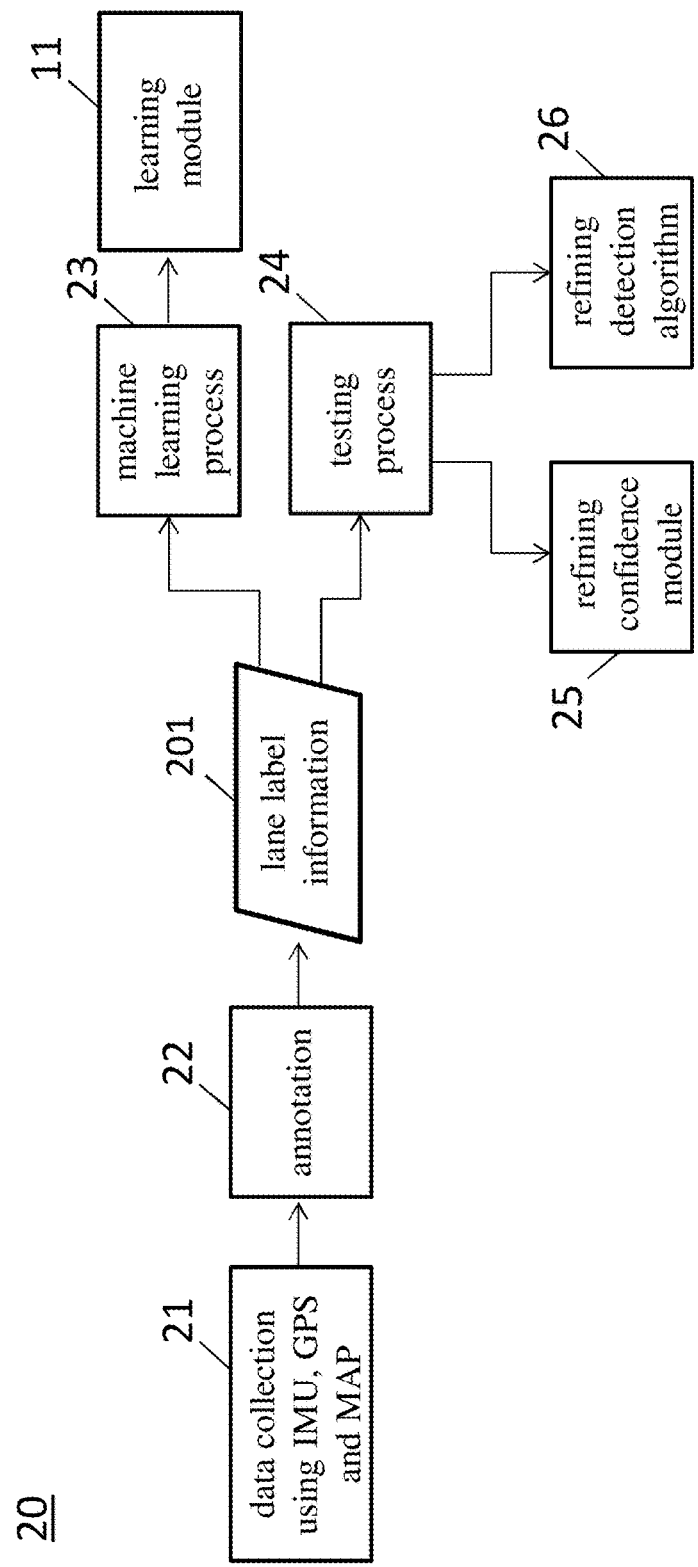
FIG. 3 is a schematic diagram showing a method of supporting the on-line lane detection system illustrated in FIG. 1, in accordance with some embodiments.

FIG. 3 is a schematic diagram showing a method 20 of supporting the on-line lane detection system 10 illustrated in FIG. 1, in accordance with some embodiments. The method 20 may be performed off line. Referring to FIG. 3, the method 20 includes operations of data collection 21, annotation 22, machine learning 23 and testing 24.

The data collection 21 is to collect data by means of sensors. The sensors may include, for example, a LiDAR, at least one camera, an IMU module, a GPS module and a MAP module. Prior to data collection, data alignment, which includes sensor calibration and time synchronization, is performed. A vehicle is equipped with multiple complementary sensors which require calibration in order to represent sensed information in a common coordinate system. The LiDAR sensor and the cameras are mounted on the roof of the vehicle. LiDAR sensors have become increasingly common in both industrial and robotic applications. LiDAR sensors are particularly desirable for their direct distance measurements and high accuracy. In an embodiment according to the present disclosure, the LIDAR sensor is equipped with many simultaneous rotating beams at varying angles, for example, a 64-beam rotating LiDAR. The multiple-beam LiDAR provides at least an order of magnitude more data than a single-beam LiDAR and enables new applications in mapping, object detection and recognition, scene understanding, and simultaneous localization and mapping (SLAM).

The inertial navigation module in an embodiment according to the present disclosure includes a global navigation satellite system (GNSS)-inertial measurement unit (IMU) module or an IMU-global positioning system (GPS) module. The GNSS satellite signals are used to correct or calibrate a solution from the IMU. The benefits of using GNSS with an IMU are that the IMU may be calibrated by the GNSS signals and that the IMU can provide position and angle updates at a quicker rate than GNSS. For high dynamic vehicles, IMU fills in the gaps between GNSS positions. Additionally, GNSS may lose its signal and the IMU can continue to compute the position and angle during the period of lost GNSS signal. The two systems are complementary and are often employed together. An integrated navigation system consisting of IMU and GPS is usually preferred due to the reduced dependency on GPS-only navigator in an area prone to poor signal reception or affected by multipath. The performance of the integrated system largely depends upon the quality of the IMU and the integration methodology. Considering the restricted use of high grade IMU and their associated price, low-cost IMUs are becoming the preferred choice for civilian navigation purposes. MEMS based inertial sensors have made possible the development of civilian land vehicle navigation as it offers small size and low-cost.

The data alignment among the sensors includes calibrating intrinsic parameters of the camera, and calibrating extrinsic parameters among the camera, the LiDAR and the inertial navigation module. In an embodiment, the intrinsic parameters of each beam are calibrated in advance using a supervised method. Also, LiDAR scans are collected in the form of sweep. A sweep is defined as a scan coverage of the LiDAR sensor rotating from 0 degree to 360 degrees. Moreover, motion distortion within the sweep is corrected assuming that the angular and linear velocity of the LiDAR motion is constant.

It is assumed that the environment is generally static and contains some 3D features, i.e., it is not just smooth ground. In order to achieve an accurate calibration, LiDAR measurements are recorded as the vehicle transitions through a series of known poses. Global pose information is irrelevant, as there is no existing map, so only local pose information is required. Local pose data may be acquired in any number of ways, e.g. from a wheel encoder and IMU, from an integrated GPS/IMU system, or from a GPS system with real-time corrections.

In addition to the calibration and transformation, time synchronization among the LiDAR sensor, cameras and inertial navigation module is achieved. Specifically, time synchronization between the LiDAR sensor and the inertial navigation module, between the inertial navigation module and the cameras, and between the LiDAR sensor and the cameras is achieved.

After data alignment, these sensors are used to collect data in an environment. In an embodiment, images of the environment are captured by the cameras in approximately 30 Hz. LiDAR scans are collected in the form of a sweep in approximately 20 Hz. Vehicle poses, including position and orientation, are collected in an "east north up" (ENU) coordinate by the inertial navigation module in approximately 50 Hz.

In the operation of annotation 22, data collected are labeled with lane markings by, for example, annual annotation. The labeled lane markings or labeled data 201, which indicate whether a lane marking exists, serve as a ground truth for input to the machine learning process 23 using, for example, a convolution neural network (CNN) for a deep module training and to a testing process 24 for a test. The labeled lane markings 201 are used to train a lane detection algorithm during the machine learning process 23, resulting in a set of parameters for use in the learning module 11 for generating hit-map images 102 described and illustrated with reference to FIG. 1. Moreover, a predicted image 188 of the system 10 is compared against the labeled lane markings 201 in the testing process 24 to determine whether the predicted image 188 is correct. If the testing 24 shows that the predicted image 188 is not correct or not desirable, then in operation 25 either a confidence module 152 is refined, or in operation 26 the lane detection algorithm is refined, or both are refined. The confidence module 152 may be trained and refined, as will be further discussed with reference to FIG. 3A. For the refinement of confidence module 152 or lane detection algorithm, more labeled data 201 are input so as to determine what scenarios cause the confidence module 152 or the lane detection algorithm to fail in the testing process 24. In addition, with more labeled data 201 being input, parameters resulting from the machine learning process 23 are optimized. Accordingly, the learning module 11 described and illustrated with reference to FIG. 1 can be fine-tuned due to optimization of the parameters. Moreover, the verification module 15 or more specifically the confidence module 152 thereof is refined. Also, the lane detection algorithm can be refined, for example, in logistic and become optimized.

Figure 4A:
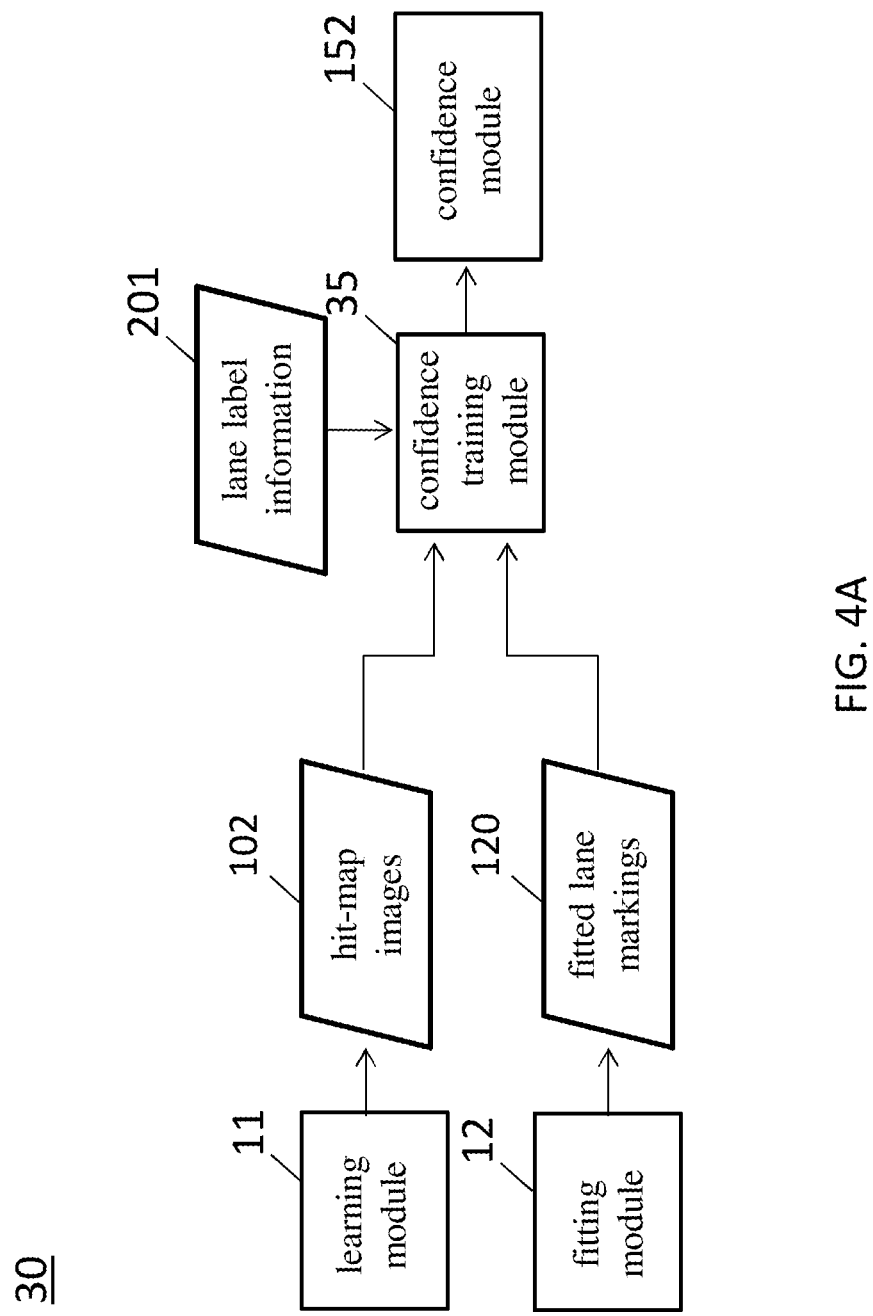
FIG. 4A is a schematic block diagram of a system for refining a confidence module illustrated in FIG. 1, in accordance with some embodiments.

FIG. 4A is a schematic block diagram of a system 30 of refining the confidence module 152 illustrated in FIG. 1, in accordance with some embodiments.

Referring to FIG. 4A, the system 30 includes a confidence training module 35, which may be considered to be a machine learning system. The confidence training module 35 is configured to train features from at least one of the learning module 11 and the fitting module 12 by using the labeled lane markings 201, and thereby generate a function or algorithm for confidence evaluation for use in the confidence module 152. Also, as previously discussed with reference to FIG. 3, with more information on labeled lane markings 201, the confidence module 152 can thereby be refined through the training process in the confidence training module 35. Also, since the learning module 11 can be refined by the additional information on labeled lane markings 201, the confidence module 152 can accordingly be refined through the training process. In addition, since the fitting module 12 can be refined due to the learning module 11 being refined, the confidence module 152 can accordingly be refined through the training process.

Moreover, the confidence training module 35 is configured to determine a failure pattern associated with the fitted lane marking. Through an analysis of failure patterns, features of various failure events may be explored. The failure events may include incorrect or unreasonable fitted lane markings from the fitting module 12. A result of the analysis may thus be used to optimize the confidence module 152 and the lane detection algorithm. The result of the analysis may be indicated automatically or manually.

As a result, for on-line operation, if confidence of a fitted lane marking from the confidence module 152 falls within or beyond a predetermined threshold, the confidence module 152 outputs the fitted lane marking for the prediction of the line(s) or marking(s) of a lane. In contrast, if confidence of a fitted lane marking from the confidence module 152 falls behind the predetermined threshold, the fitted lane marking is rejected. For off-line training, confidence of a fitted lane marking from the confidence module 152 is compared against a ground truth. If the confidence does not match the ground truth, a failure event is recognized and then analyzed to determine a failure pattern so as to refine the confidence module 152.

Figure 4B:
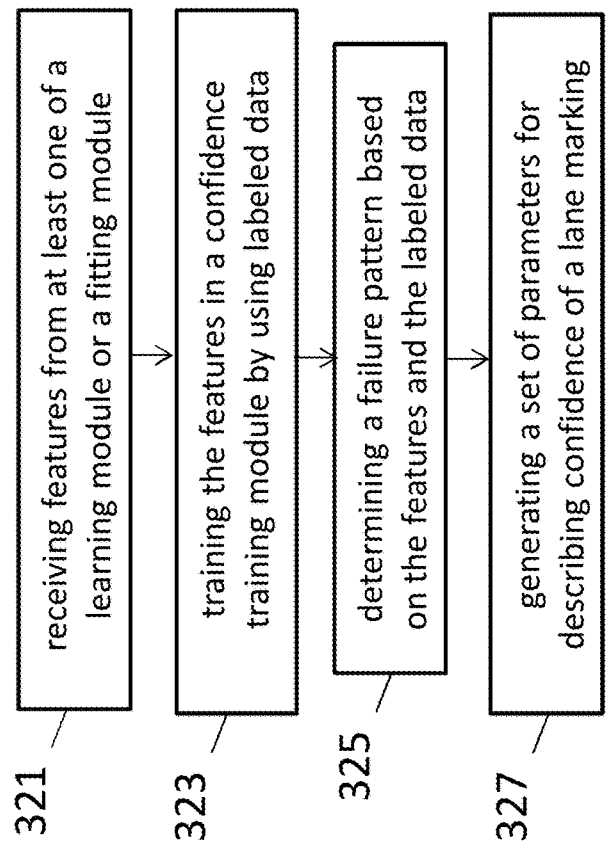
FIG. 4B is a flow diagram showing a method of refining a confidence module illustrated in FIG. 1, in accordance with some embodiments.

FIG. 4B is a flow diagram showing a method 32 of refining the confidence module 152 illustrated in FIG. 1, in accordance with some embodiments.

Referring to FIG. 4B and also FIG. 4A, in operation 321, features from at least one of the learning module 11 or the fitting module 12 are received.

Next, in operation 323, the features are trained in the confidence training module 35 by using labeled data 201.

In operation 325, a failure pattern is determined based on the features and the labeled data 201.

Moreover, in operation 327, a set of parameters for describing confidence of a lane marking is generated. The set of parameters serve as an algorithm for confidence evaluation in the confidence module 152.

Furthermore, by providing additional information on labeled data 201 to the confidence training module 35, the confidence module 152 can be refined or optimized. Also, with the additional information on labeled data 201, the learning module 11 can be refined, and in turn the confidence module 152 can accordingly be refined or optimized through the training process. In addition, since the fitting module 12 can be refined due to the learning module 11 being refined, the confidence module 152 can accordingly be refined or optimized through the training process.

Figure 5:
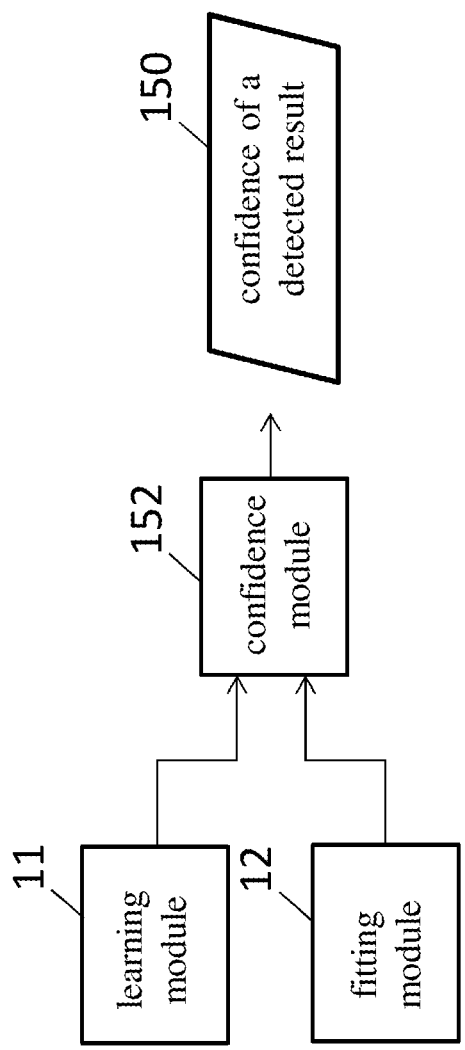
FIG. 5 is a diagram showing function of a confidence module in the system illustrated in FIG. 1, in accordance with some embodiments.

FIG. 5 is a diagram showing function of the confidence module 152 in the system 10 illustrated in FIG. 1, in accordance with some embodiments.

Referring to FIG. 5, the confidence module 152 as a result of the training process of FIG. 4A may be applied to on-line lane detection in the system 10 as illustrated in FIG. 1. In the present embodiment, the confidence module 152 determines confidence of features from at least one of the learning module 11 or the fitting module 12, and generates a confidence 150 of a detected result. In a confidence check, the confidence module 152 determines, based on the parameters for expressing a lane marking in an arc, whether a fitted lane marking from the fitting module 12 is reasonable. In an embodiment, the confidence 150 is provided to the testing module 24 described and illustrated in FIG. 3 to determine whether the confidence module 152 should be refined. For example, if the confidence 150 of a predicted lane marking is relatively strong while the testing shows a significant difference between the labeled data 201 and the predicted lane marking, it may then be determined that refinement of the confidence module 152 or its associated algorithm for confidence evaluation is required. Also for example, on the contrary, if the confidence 150 of a predicted lane marking is relatively weak while the testing shows no significant difference between the labeled data 201 and the predicted lane marking, it may then be determined that refinement of the confidence module 152 or its associated algorithm for confidence evaluation is required.

Figure 6:
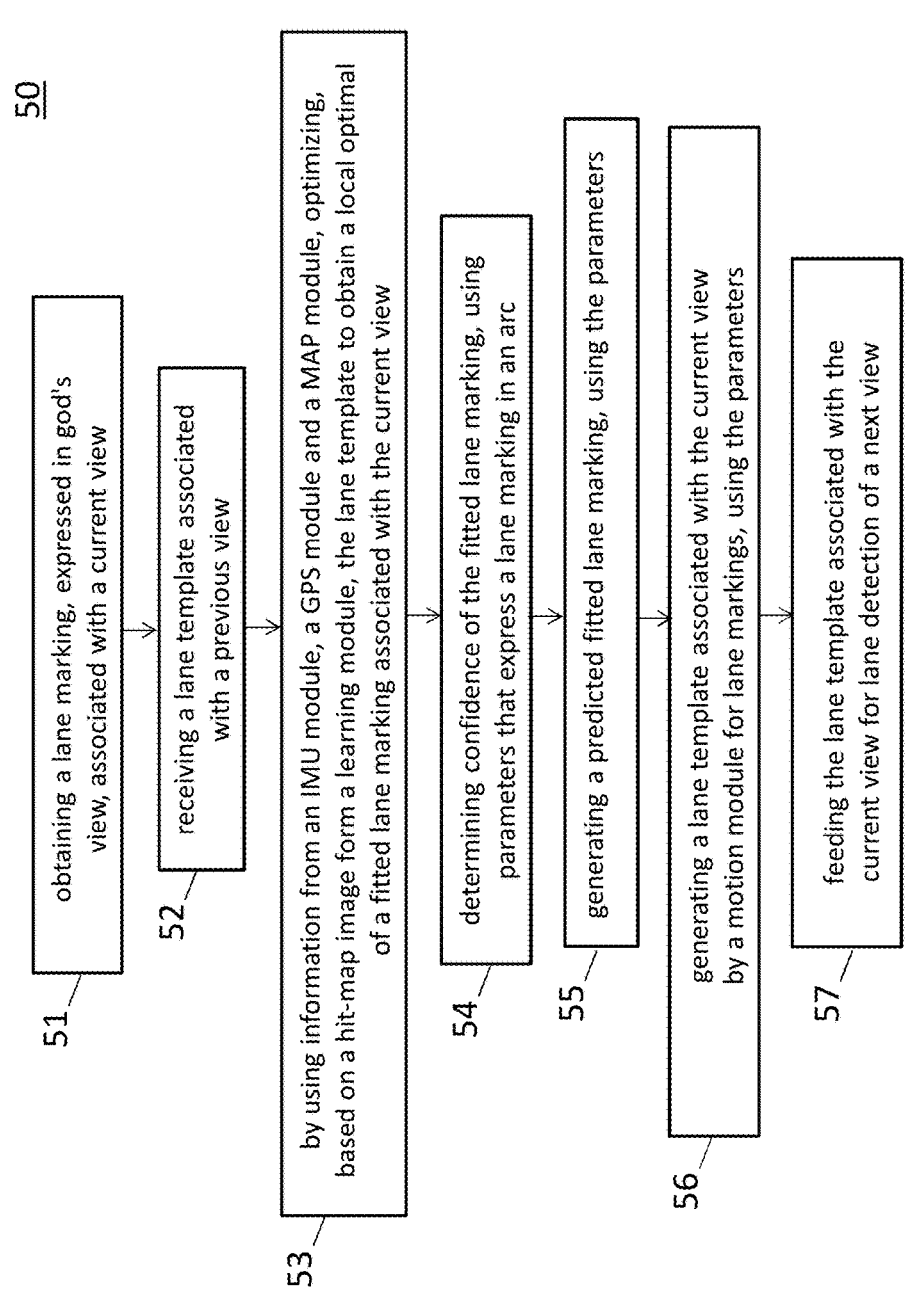
FIG. 6 is a flow diagram showing a method of on-line lane detection, in accordance with an embodiment.

FIG. 6 is a flow diagram showing a method 50 of on-line lane detection, in accordance with an embodiment.

Referring to FIG. 6, in operation 51, a lane marking associated with a current view is obtained. The lane marking is expressed in god's view.

In operation 52, a lane template associated with a previous view is received. Also referring to FIG. 1, the lane template is generated by the motion module 183 for lane markings.

Next, in operation 53, also referring to FIG. 1, by using information from an IMU module, a GPS module and a MAP module, based on a hit-map image 102 form the learning module 11, the lane template is optimized to obtain a local optimal of a fitted lane marking associated with the current view.

In operation 54, confidence of the fitted lane marking is determined, using parameters that express a lane marking in an arc. Also referring to FIG. 1, the confidence module 152 determines the confidence of a fitted lane marking.

In operation 55, a predicted lane marking is generated by, for example, the parameterizing module 18 of FIG. 1, using the parameters.

In operation 56, a lane template associated with the current view is generated by the motion module 183, using the parameters.

Subsequently, in operation 57, the lane template associated with the current view is fed to the fitting module 12 of FIG. 1 for lane detection of a next view.

Figure 7:
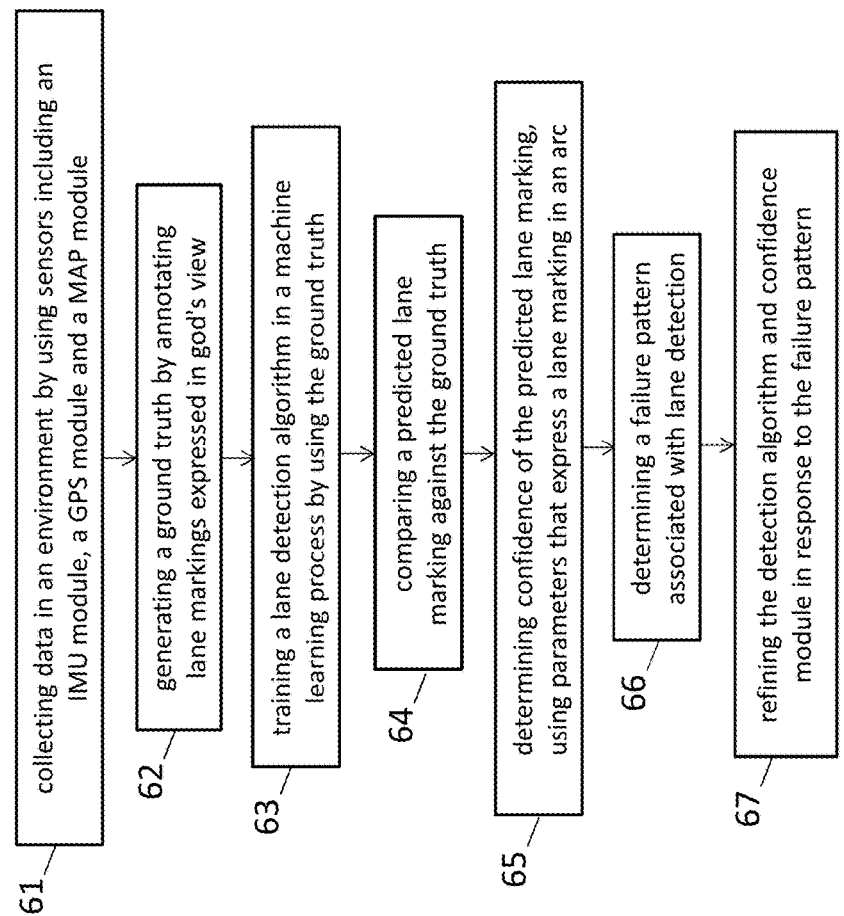
FIG. 7 is a flow diagram showing a method of supporting on-line lane detection, in accordance with an embodiment.

FIG. 7 is a flow diagram showing a method 60 of supporting on-line lane detection, in accordance with an embodiment.

Referring to FIG. 7, in operation 61, data are collected in an environment by using sensors that include an IMU module, a GPS module and a MAP module.

Next, in operation 62, a ground truth is generated. Also referring to FIG. 2, the collected data are annotated with lane markings expressed in god's view so as to generate a labeled data that serves as a ground truth.

In operation 63, a lane detection algorithm is trained in a machine learning process by using the ground truth.

In operation 64, a predicted lane marking generated according to the lane detection algorithm is compared against the ground truth. Then in operation 65, a comparison result determines whether a confidence, determined by a confidence module using parameters that express a lane marking in an arc, of the predicted lane is reasonable.

Subsequently in operation 66, the lane detection algorithm may be refined by, for example, adding additional information on labeled data. Alternatively, in operation 67, the confidence module may be refined by the additional information. In an embodiment, both the lane detection algorithm and the confidence module are refined or optimized.

FIG. 8 is a block diagram of a system 70 for lane detection, in accordance with some embodiments.

Referring to FIG. 8, the system 70 includes a processor 71, a computer server 72, a network interface 73, an input and output (I/O) device 75, a storage device 77, a memory 79, and a bus or network 78. The bus 78 couples the network interface 73, the I/O device 75, the storage device 77 and the memory 79 to the processor 71.

Accordingly, the processor 71 is configured to enable the computer server 72, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 71, the computer server 72, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 72 is configured to utilize the I/O port 75 communicate with external devices via a network 78, such as a wireless network. In certain embodiments, the I/O port 75 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 72 is configured to utilize the I/O port 75 to wirelessly communicate with a client device 76, such as a mobile phone, a tablet PC, a portable laptop or any other computing device with internet connectivity. Accordingly, electrical signals are transmitted between the computer server 72 and the client device 76.

In some embodiments in accordance with the present disclosure, the computer server 72 is a virtual server capable of performing any function a regular server has. In certain embodiments, the computer server 72 is another client device of the system 70. In other words, there may not be a centralized host for the system 70, and the client devices 76 in the system are configured to communicate with each other directly. In certain embodiments, such client devices 76 communicate with each other on a peer-to-peer (P2P) basis.

The processor 71 is configured to execute program instructions that include a tool module configured to perform methods as described and illustrated with reference to FIGS. 4B, 6 and 7. Accordingly, in an embodiment in accordance with the method 30 described and illustrated with reference to FIG. 4B, the tool module is configured to execute the operations including: receiving features from at least one of a learning module or a fitting module; training the features in a confidence training module by using labeled data; determining a failure pattern based on the features and the labeled data; and generating a set of parameters for describing confidence of a lane marking.

In another embodiment, in accordance with the method 50 described and illustrated with reference to FIG. 6, the tool module is configured to execute the operations including: obtaining a lane marking, expressed in god's view, associated with a current view; receiving a lane template associated with a previous view; by using information from an IMU module, a GPS module and a MAP module, optimizing, based on a hit-map image form a learning module, the lane template to obtain a local optimal of a fitted lane marking associated with the current view; determining confidence of the fitted lane marking, using parameters that express a lane marking in an arc; generating a predicted fitted lane marking, using the parameters; generating a lane template associated with the current view by a motion module for lane markings, using the parameters; and feeding the lane template associated with the current view for lane detection of a next view.

In yet another embodiment, in accordance with the method 60 described and illustrated with reference to FIG. 7, the tool module is configured to execute the operations including: collecting data in an environment by using sensors including an IMU module, a GPS module and a MAP module; generating a ground truth by annotating lane markings expressed in god's view; training a lane detection algorithm in a machine learning process by using the ground truth; comparing a predicted lane marking against the ground truth; determining confidence of the predicted lane marking, using parameters that express a lane marking in an arc; determining a failure pattern associated with lane detection; and refining the detection algorithm or refining the confidence module or both in response to the failure pattern.

The network interface 73 is configured to access program instructions and data accessed by the program instructions stored remotely through a network (not shown).

The I/O device 75 includes an input device and an output device configured for enabling user interaction with the system 70. In some embodiments, the input device comprises, for example, a keyboard, a mouse, and other devices. Moreover, the output device comprises, for example, a display, a printer, and other devices.

The storage device 77 is configured for storing program instructions and data accessed by the program instructions. In some embodiments, the storage device 77 comprises, for example, a magnetic disk and an optical disk.

The memory 79 is configured to store program instructions to be executed by the processor 71 and data accessed by the program instructions. In some embodiments, memory 79 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 79 is incorporated into the processor 71.

Thus, specific embodiments and applications have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A method of lane detection for a non-transitory computer readable storage medium storing one or more programs, the one or more programs comprising instructions, which when executed by a computing device, cause the computing device to perform the following steps comprising:
    generating a ground truth;
    off-line training a lane detection algorithm by using the ground truth, the lane detection algorithm using parameters that express a lane marking in an arc;
    on-line generating a predicted lane marking for a current view;
    comparing the predicted lane marking against the ground truth; and
    off-line refining the lane detection algorithm by using the lane template associated with the current view to generate an improved lane template used for improved lane detection of a next view;
    wherein, a detected lane map is generated relative to a moving vehicle using the improved lane template and the predicted lane marking.

2. The method according to claim 1, wherein generating a ground truth includes:
    collecting data in an environment by using sensors that include an inertial measurement unit (IMU) module, a global positioning system (GPS) module and a mapping (MAP) module; and
    generating a labeled lane marking by annotating a lane marking expressed in god's view.

3. The method according to claim 2, wherein the IMU module provides information on at least one of a vehicle pose or a vehicle speed, and the global positioning system (GPS) module provides global position information.

4. The method according to claim 2, wherein the MAP module is configured to create a map of its surroundings, and orient a vehicle itself within this map.

5. The method according to claim 1, wherein on-line generating a predicted lane marking includes:
    generating a hit-map image for the current view based on the lane detection algorithm; and
    generating a fitted lane marking based on the hit-map image and a lane template that includes features of a view immediately previous to the current view.

6. The method according to claim 5, wherein generating a fitted lane marking includes:
    optimizing, based on priors or constraints, the lane template to obtain a local optimal.

7. The method according to claim 5 further comprising:
    determining that a confidence level of the fitted lane marking is reasonable, using the parameters; and
    outputting the fitted lane marking as a predicted lane marking.

8. The method according to claim 5 further comprising:
    determining that a confidence level of the fitted lane marking is unreasonable, using the parameters; and
    rejecting the fitted lane marking.

9. The method according to claim 1, wherein off-line refining the lane detection algorithm includes:
    adding additional ground truth data in the off-line training.

10. The method according to claim 1 further comprising:
    on-line generating another predicted lane marking, using a refined lane detection algorithm.

11. A system for lane detection, the system comprising:
    an internet server, comprising:
        an I/O port, configured to transmit and receive electrical signals to and from a client device;
        a memory;
        one or more processing units; and
        one or more programs stored in the memory and configured for execution by the one or more processing units, the one or more programs including instructions for:
            generating a ground truth;
            off-line training a lane detection algorithm by using the ground truth, the lane detection algorithm using parameters that express a lane marking in an arc;
            on-line generating a predicted lane marking for a current view;
            comparing the predicted lane marking against the ground truth; and
            off-line refining the lane detection algorithm by using the lane template associated with the current view to generate an improved lane template used for improved lane detection of a next view;
        wherein, a detected lane map is generated relative to a moving vehicle using the improved lane template and the predicted lane marking.

12. The system according to claim 11, wherein generating a ground truth includes:
    collecting data in an environment by using sensors that include an inertial measurement unit (IMU) module, a global positioning system (GPS) module and a mapping (MAP) module; and
    generating a labeled lane marking by annotating a lane marking expressed in god's view.

13. The system according to claim 12, wherein the IMU module provides information on at least one of a vehicle pose or a vehicle speed, and the global positioning system (GPS) module provides global position information.

14. The system according to claim 12, wherein the MAP module is configured to create a map of its surroundings, and orient a vehicle itself within this map.

15. The system according to claim 11, wherein on-line generating a predicted lane marking includes:
generating a hit-map image for the current view based on the lane detection algorithm; and
generating a fitted lane marking based on the hit-map image and a lane template that includes features of a view immediately previous to the current view.

16. The system according to claim 15, wherein generating a fitted lane marking includes:
optimizing, based on priors or constraints, the lane template to obtain a local optimal.

17. The system according to claim 15 further comprising:
determining that a confidence level of the fitted lane is reasonable, using the parameters; and
outputting the fitted lane marking as a predicted lane marking.

18. The system according to claim 15 further comprising:
determining that a confidence level of the fitted lane is unreasonable, using the parameters; and
rejecting the fitted lane marking.

19. The system according to claim 11, wherein off-line refining the lane detection algorithm includes:
adding additional ground truth data in the off-line training.

20. The system according to claim 11 further comprising:
on-line generating another predicted lane marking, using a refined lane detection algorithm.

* * * * *